Patented Jan. 10, 1933

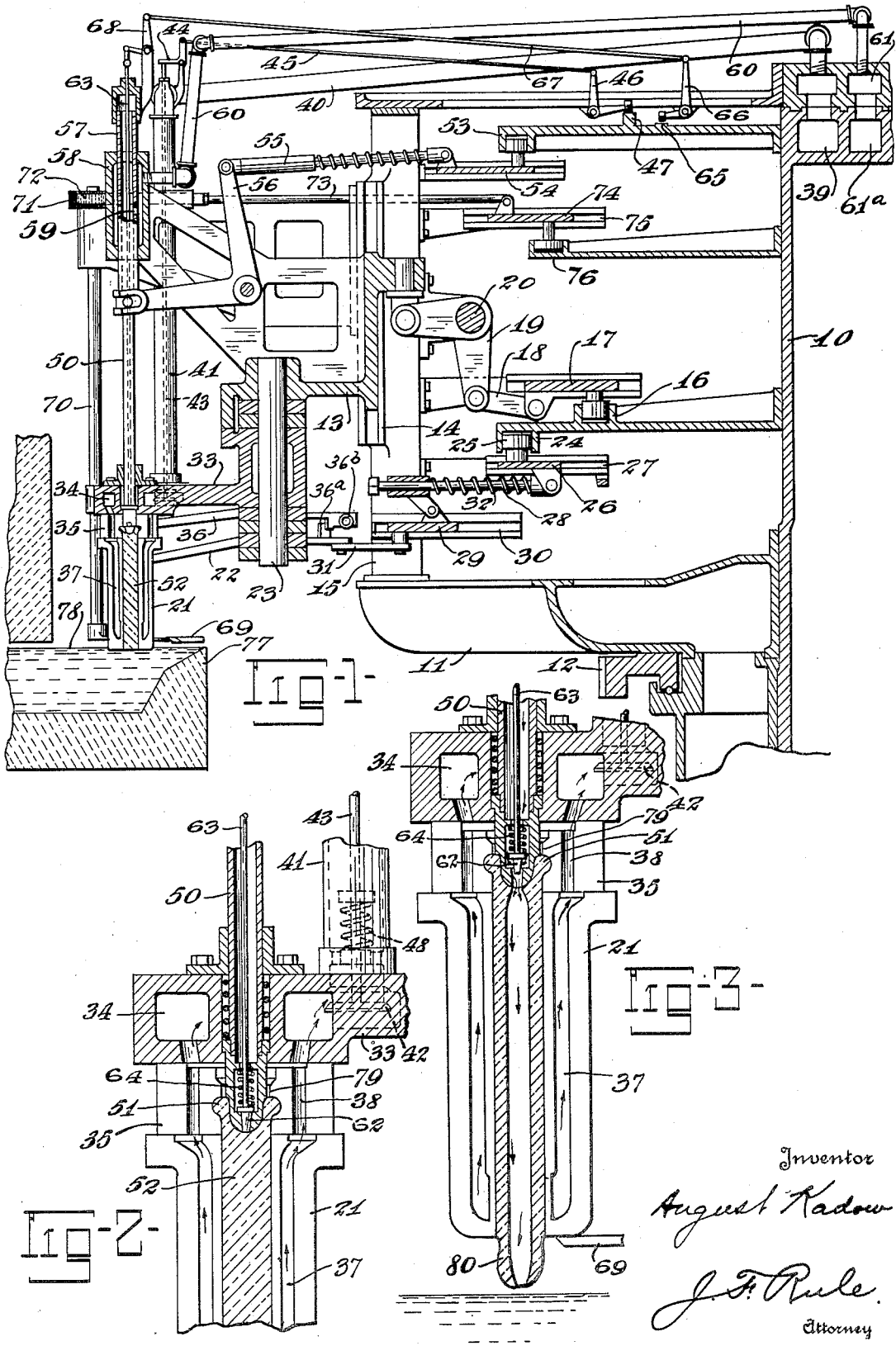

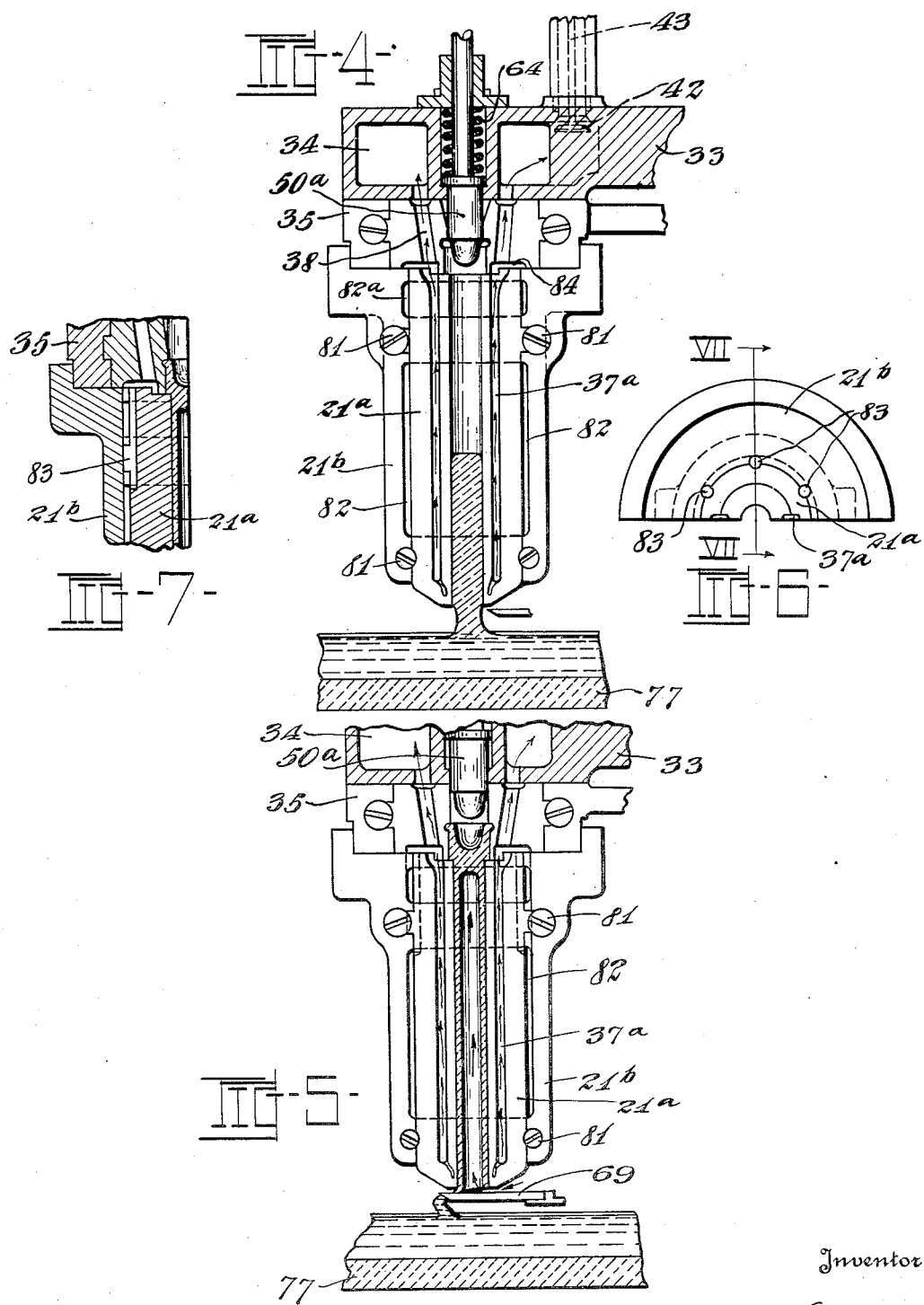

1,894,100

UNITED STATES PATENT OFFICE

AUGUST KADOW, OF TOLEDO, OHIO, ASSIGNOR TO OWENS-ILLINOIS GLASS COMPANY, OF TOLEDO, OHIO, A CORPORATION OF OHIO

METHOD OF AND APPARATUS FOR MAKING GLASS TUBES

Application filed October 30, 1929. Serial No. 403,587.

My invention relates to a method and apparatus for forming or casting glass tubing in molds.

At the present day, the usual method of forming glass tubing consists in drawing a hollow rod or tube of glass continuously from a supply body of molten glass, the tube being given the desired size and shape as it leaves the supply body and while still in a molten or plastic condition, the glass after cooling sufficiently being cut into desired lengths. Glass tubing made by this method varies considerably in diameter as well as in the thickness of its walls, owing to variations in the temperature and viscosity of the glass, which cause some portions of the tubing to be drawn out to small diameter and thinner walls than other portions. It is also practically impossible to prevent flattening or distortion of the tubing before it has hardened sufficiently to retain its shape. As a result, the tubes made by this method are not of uniform diameter, the thickness of the walls is not uniform, and they are not symmetrical or circular in cross-section.

An object of the present invention is to overcome the above difficulties and provide a method of making tubes of symmetrical shape and uniform diameter and thickness. In accordance with the present invention, the tubes are cast in molds which permit the shape of the tubes to be accurately controlled and made uniform to meet the exacting requirements of tubes for various commercial purposes. The invention further provides a novel method of making glass tubing of various sizes and shapes in cross-section which could not be made by the continuous drawing methods now in vogue.

In accordance with my invention, the tubes are formed or cast in molds, the glass being drawn into the molds by suction and given hollow formation in a manner hereinafter fully set forth.

Other objects of the invention and the exact nature thereof will be understood from the following description taken in connection with the accompanying drawings in which,—

Fig. 1 is a fragmentary sectional elevation of a machine designed to carry out the present method.

Fig. 2 is a sectional elevation on a larger scale of parts shown in Fig. 1, particularly the mold, plunger, vacuum chamber and associated parts.

Fig. 3 is a view similar to Fig. 2, but showing the parts in a different position at a later period in the formation of a tube.

Fig. 4 shows a modified construction adapted for practicing a somewhat modified method which does not require the use of air pressure.

Fig. 5 is a similar view, showing the parts at a later period in the operation.

Fig. 6 is a top plan view of a mold section shown in Fig. 4.

Fig. 7 is a sectional elevation at the line VII—VII on Fig. 6.

Referring particularly to Figs. 1 to 3, the machine herein shown is similar in many respects to an Owens type of suction machine for making bottles and other hollow ware, an example of such suction machine being shown in the patent to LaFrance, Number 1,185,687, June 6, 1916. It is to be understood, however, that the machine herein disclosed differs from that shown in the LaFrance patent and from all other machines for making bottles and other hollow containers, in important particulars which will fully appear hereinafter.

The machine comprises a central stationary column 10 on which is mounted a mold carriage 11 adapted to be continuously rotated about the vertical axis of the column 10. The carriage is driven by a motor (not shown) operating through gearing including a ring gear 12 on the mold carriage.

Mounted on the mold carriage are heads or units each comprising a dip frame 13 mounted to reciprocate vertically in guides 14 on vertical standards 15 forming part of the mold carriage. The up and down movements of the dip frames are controlled by a stationary cam 16 which actuates slide blocks 17 operating through links 18 and bell cranks 19, each of the latter having a pivotal connection 20 with the corresponding dip frame 13.

Each dip frame carries a split mold 21 which comprises separable sections movable to and from each other for closing and opening the mold, said sections having their meeting faces in a vertical plane. The mold sections are carried on arms 22 mounted on a pivot shaft 23 fixed to and depending from the frame 13. The opening and closing movements of the mold 21 are controlled by a stationary cam 24 on which runs a roll 25 carried by a slide block 26 slidable radially of the mold carriage on guides 27 on said carriage. The slide block 26 is connected through a rod 28 to a slide 29 which reciprocates in guides 30, the slide 29 having operating connections 31 with the mold arms. A spring 32 provides a yielding connection between the parts 29 and 26 and thus serves as a safety device to prevent breakage of parts in the event of any obstruction preventing the mold sections from closing.

Mounted on the shaft 23 is an arm or plate 33 formed with a vacuum chamber 34. Interposed between the plate 33 and the mold 21 is a head mold 35 comprising separable sections carried on arms 36 pivotally mounted on the shaft 23. The head mold may be opened by means of lugs 36ª which engage extensions of the arms 36 during the final opening movement of the body mold 21. A spring 36ᵇ closes the head mold sections.

The body mold 21 has formed in its meeting faces, vacuum chambers or channels 37 which are vertically disposed and extend substantially the entire length of the mold about parallel with the mold cavity which extends centrally throughout the length of the mold and may be of uniform diameter throughout. The mold cavity is circular in cross-section for making circular tubing, but may be made of other cross-sectional shapes for making other forms of tubes. The head mold 35 is provided with vacuum passageways 38 which provide communication between the channels 37 and the vacuum chamber 34.

A vacuum chamber 39 in the upper end of the column 10, communicates through a vacuum pipe line 40, 41 with the vacuum chamber 34. A valve 42 at the lower end of the pipe 41 controls the exhaust of air from the vacuum chamber 34. The valve 42 is provided with a stem 43 which extends upward through the pipe 41. The upper end of said stem engages a bell crank 44 connected through a rod 45 with a bell crank 46 actuated by a stationary cam 47. The cam operates at the required intervals, as hereinafter pointed out, to open the valve 42 against the tension of a spring 48 and thereby cause the air to be exhausted from the chamber 34.

A tubular plunger 50 is mounted for vertical reciprocation on the dip frame, the lower end of the plunger being arranged to enter the head mold 35 and cooperate with the latter in forming an annular bead or head 51 on a blank of glass 52 when the latter is drawn by suction into the mold as hereinafter described. The movements of the plunger are controlled by a stationary cam 53 (Fig. 1) having an operating connection with the plunger through a slide 54, link 55 and bell crank 56. The upper portion of the plunger rod comprises an enlarged tubular section 57 which extends through and is slidable up and down in a hollow casing 58 which forms part of the dip frame 13. Said casing 58 provides an air chamber which communicates with the interior of the plunger rod through a port 59. An air line 60 leads from said chamber to an air chamber 61 which communicates with an air pressure chamber 61ª in the upper end of the column 10. A valve 62 (Fig. 2) is provided in the plunger tip. Said valve is carried at the lower end of a valve stem 63 which extends upwardly beyond the plunger rod. The valve is held seated in its closed position by a coil spring 64 and is opened by a stationary cam 65 (Fig. 1) operating through connections comprising a bell crank 66, a rod 67 and bell crank 68, the latter connected to the valve stem 63.

A knife 69 may be provided, if desired, for cutting off the excess glass at the lower end of the mold after a charge has been gathered, although I have found in practice that the machine may be satisfactorily operated for making various forms and sizes of tubing, without the use of a knife. The knife is mounted on the lower end of a vertical rock shaft 70 journaled in the dip frame. The rock shaft carries at its upper end a pinion 71 driven by a rack 72 on a rod 73 connected to a slide plate 74 which reciprocates radially of the machine in guides 75 on the mold carriage, under the control of a stationary cam 76.

The operation of the machine shown in Figs. 1 to 3 is as follows:

The mold carriage 11 is rotated continuously to bring the molds 21 in succession to a charging position over a tank or container 77 in which a supply body 78 of molten glass is continuously maintained. As a blank mold is brought to the gathering position, the cam 16 operates to move the dip frame 13 vertically downward, thereby lowering the mold into contact with the pool of glass. The cam 47 now operates to open the valve 42 so that the air is exhausted from the vacuum chamber 34. Said chamber being in communication with the mold cavity in the blank mold 21 and head mold 35, the air is withdrawn from the mold, causing a blank of glass 52 to be drawn by suction into the mold.

A large portion of the air which fills the mold cavity is withdrawn through a passageway 79 surrounding the plunger which at this time is in its lowered position. A portion of the air, however, is withdrawn through the channels 38 and 37, the latter being in communication with the mold cavity through the narrow spaces between the meeting faces of the molds. By providing the suction chambers or channels 37, leakage of air between the meeting faces of the mold sections into the mold cavity is prevented, and any air which would otherwise be trapped between the walls of the mold and the entering glass is withdrawn so that the glass completely fills the mold cavity and conforms to the shape of the mold walls. The vacuum channels 37 also assist in quickly filling the mold.

After the mold is thus filled, the dip frame is lifted. At substantially the same time, the cam 65 operates to lift the air pressure valve 62 and permit air under pressure to be supplied through the plunger which at this time remains in its lowered position as shown in Fig. 3. By the time the air valve 62 is opened, the glass in contact with the walls of the mold has been chilled and hardened to a sufficient depth to form a tube of the desired thickness. When the air valve opens, the air pressure immediately blows out the soft glass which forms the interior portion or core of the blank 52. There is thus left within the mold, a tube of glass as shown in Fig. 3. The knife 69, under the influence of the cam 76, now swings across the bottom of the mold and severs the excess portion or tail 80 of glass which projects downward below the mold. This severing operation preferably takes place before the mold has passed beyond the tank, so that the cutoff portion of glass drops back into the tank.

After the mold passes beyond the tank, the cam 24 operates to separate the body mold sections, leaving the tube of glass supported in the head mold 35. The bare blank of glass may then be grasped by any suitable take-out mechanism, after which the head mold is opened to release the blank from the machine, or the blank may be discharged from the machine without the use of such take-out mechanism by opening the head mold and dropping the blank. After the blank is removed, the head portion may be cut off or removed, leaving a tube of uniform diameter throughout its length. I have also found that tubes made by the method above set forth, have their walls of substantially uniform thickness throughout.

Although I have shown the body mold 21 and head mold 35 as separate molds adapted to be opened separately, it will be understood that they may be made as a single mold, that is, with the head mold sections made integral with the body mold sections. I have also found that the mold 21, instead of being made in separable sections, may be a solid mold, that is, may be made in one piece. When thus made, the mold is withdrawn endwise from the tube of glass which has been formed therein. In this instance, the mold is preferably tapered very slightly, being a few thousandths of an inch larger in diameter at the upper end than at the lower end to facilitate the withdrawal of the mold.

Figs. 4 to 6, inclusive, illustrate a modified mold construction adapted for a modified method of making tubing. In accordance with this modification, the tube is formed in the mold by the use of suction alone, the use of air pressure being dispensed with. In the construction here shown, each mold half or section is made in two separate parts, namely, an inner section 21$^a$ in which the mold cavity is formed, and an outer section 21$^b$, said parts being fastened together by screws 81. The section 21$^a$ is substantially semi-cylindrical in form, the inner face of the section 21$^b$ being correspondingly shaped to receive the section 21$^a$. The outer section, however, is cored or recessed for the greater portion of its length to form a space 82. When the two mold halves are brought together the annular space 82 extends entirely around the inner mold section 21$^a$ and provides a vacuum capacity chamber, the purpose of which will appear more fully hereinafter. The chamber 82 also comprises a section 82$^a$ in the upper portion of the mold. Vertical channels or bores 83 extend downward from the upper surface of the mold through the section 82$^a$ and into the main chamber 82, providing passageways through which the air can be exhausted. The channels 83 open at their upper ends into an annular recess 84 formed in the lower surface of the head mold 35, admitting the air to the channels 38 and thence to the vacuum chamber 34. As shown in Figs. 4 and 5, the plunger 50$^a$ and its stem are solid, the valve 62 being omitted.

The form of mold illustrated in Figs. 4 to 7 may be used for forming tubes by the method above described in connection with Figs. 1 to 3, in which the glass is blown to tubular form by air under pressure, but is particularly adapted to the method in which suction alone is used to form the tube. This method is as follows:—

The valve 42 is opened for a comparatively short time while the mold is in dip, and a certain amount of air is thereby exhausted from the chamber 34 while the mold is in contact with the supply body, so that a limited amount of glass is drawn into the mold, as shown in Fig. 4, such amount being insufficient to fill the mold. The mold is then lifted from the supply body and the knife 69 operated to sever the glass at the lower surface of the mold. This severance takes place while the vacuum or suction is still active. The knife does not make an air tight seal with the bottom of the mold and atmospheric pressure is therefore admitted at the lower end of the mold after the severing operation.

That portion of the glass in the mold which is in contact with the mold walls is chilled to a certain depth and retains its position while the interior of the mass remains in a comparatively liquid or fluent condition. The atmospheric pressure causes this fluent glass to move upward into the upper portion of the mold cavity, the glass as it moves up being expanded into contact with the walls of the mold. In this manner, the glass is blown into the form of a tube extending approximately the full length of the mold.

The opposing faces of the mold sections between the channels 37ª and the mold cavity are spaced a slight distance apart (a few thousandths of an inch) to provide restricted passageways through which the air is drawn from the mold cavity.

I have found that in practicing the method illustrated in Figs. 4 and 5, in which the tube is formed entirely by the use of suction without super-atmospheric pressure, it is advisable to operate with a substantially lower air pressure than with the method illustrated in Figs. 1 to 3, wherein the blank mold is first filled with glass and then blown to tubular form by super-atmospheric pressure. In the method shown in Figs. 4 and 5, the supply of glass must be cut off when a sufficient amount has entered the mold to form the tube and this can best be controlled when the degree of vacuum is comparatively low.

I have found that the provision of the vacuum chamber 82 within the mold is an important factor in forming the tube by this method. It prevents the outside air from leaking into the channels 37ª through the spaces between the meeting faces of the mold halves, and assists in drawing the air from said channels and from the mold cavity. Moreover, by providing the capacity chamber 82, the degree of vacuum employed may be kept sufficiently low and the rate of exhaustion of air from the mold cavity retarded to a sufficient degree to permit accurate control of the quantity of glass admitted to the mold, and also to permit the accurate formation of the tube within the mold cavity.

Although I have shown a knife for severing the glass at the lower end of the mold, I have found in practice that with this method also, in which suction alone is employed to form the tube, the knife may be dispensed with. In practicing the method, the mold is lifted from the supply body at the instant, or at a very short time interval before, the complete charge of glass has entered the mold. As the bottom of the mold moves upward above the level of the pool of glass, the atmospheric pressure instead of operating through the pool of glass, is admitted directly to the glass at the bottom of the mold and blows the glass upward to complete the tube in the manner above described, at the same time acting to squeeze off or assist in severing at the bottom of the mold, the tail of glass extending from the mold to the supply body.

Modifications may be resorted to within the spirit and scope of my invention.

What I claim is:

1. The method of making a glass tube which comprises forming a blank of molten or plastic glass, chilling the walls of the blank to form a tubular casing or skin, and removing the core or interior portion of the blank while still molten or plastic by differential pneumatic pressure applied at opposite ends of the blank.

2. The method of producing glass tubing which comprises forming from molten glass a solid blank having the exterior shape or contour of the tube to be produced, chilling the walls of the blank to a depth corresponding to the thickness of tube desired, and blowing the molten or plastic glass forming the interior of the blank through one end thereof by super-atmospheric pressure applied at the opposite end of the blank.

3. The method of producing glass tubing which comprises forming from molten glass a solid blank having the exterior shape or contour of the tube to be produced, chilling the walls of the blank to a depth corresponding to the thickness of tube desired, and removing the plastic glass from the interior of the blank by differential air pressure applied at the ends of the blank.

4. The method of producing glass tubing which comprises forming from molten glass a solid blank having the exterior shape or contour of the tube to be produced, chilling the walls of the blank to a depth corresponding to the thickness of tube desired, and forcing out of the blank the soft glass from the interior thereof, by air pressure applied at one end of the blank.

5. The method of producing a glass tube which comprises introducing molten glass into a mold cavity and thereby forming a blank of plastic glass, the shape of which conforms substantially to the exterior shape of the tube to be produced, causing the walls of the blank to be chilled and hardened to a predetermined depth by extraction of heat by the mold walls, and removing the core of plastic glass from the blank by differential pneumatic pressure applied at the ends of mold cavity.

6. The method of producing a glass tube which comprises introducing molten glass into a mold cavity and thereby forming a blank of plastic glass, the shape of which conforms substantially to the exterior shape of the tube to be produced, causing the walls of the blank to be chilled and hardened to a predetermined depth by extraction of heat by the mold walls, removing the core of plastic glass from the blank by pneumatic pressure while the tube is retained in the mold, and then separating the tube from the mold.

7. The method of forming a glass tube which comprises drawing a blank of molten or plastic glass by suction into a mold cavity, causing the walls of the mold to extract heat from the blank and chill the walls of the blank to a predetermined depth, forcing the interior comparatively soft glass out of the blank and separating said soft glass from the blank while the latter is in the mold, and then separating the blank from the mold.

8. The method of forming a glass tube which comprises introducing molten glass by suction into a mold at one end thereof to fill the mold and then applying pressure at the other end of the mold, and forcing the plastic interior or core of the blank outward through the first mentioned end of the mold, leaving in the mold a tube of chilled glass.

9. The method of forming a glass tube which comprises bringing the lower open end of a mold into contact with a pool of molten glass, extracting air from the mold and thereby causing molten glass to enter and fill the mold cavity, and applying air at the upper end of the mold cavity under sufficient pressure and for a sufficient length of time to blow the soft core of the blank out of the mold and leave a tube of glass which has been chilled by contact with the walls of the mold.

10. The method of producing a tube of glass which comprises forming a cylindrical solid blank of plastic glass, chilling the walls of the blank to a predetermined depth, and blowing the interior plastic core of glass from the blank without changing the conformation of the exterior walls thereof.

11. The method which comprises projecting an elongated blank of plastic glass from a supply body of molten glass, chilling the walls of the bank while the latter is united with the supply body, and blowing the glass forming the interior of the blank back into the supply body.

12. The method which comprises projecting an elongated blank of plastic glass from a supply body of molten glass, chilling and solidifying the walls of the blank, and then giving the blank without changing its exterior shape and dimensions, a tubular form by differential pneumatic pressure applied while the blank is integrally united with the supply body.

13. The method which comprises projecting an elongated blank of glass from a supply body of molten glass, chilling the walls of the blank, and forcing the glass from the interior of the blank back into the supply body by pneumatic pressure while the blank is still integral with the supply body.

14. The method of forming a tube which consists in bringing a mold cavity into operative association with a supply body of molten glass, causing a blank of glass to enter and fill the mold cavity, giving the blank a tubular form by differential pneumatic pressure within the mold cavity while the blank is still united with the supply body, and separating the blank from the supply body.

15. In a machine for forming glass tubes, the combination of a mold open at one end to receive a charge, means for introducing a charge of molten glass into the mold through said open end and forming a solid blank within the mold and causing the walls of the blank to be chilled and hardened to a desired depth, and means for applying air pressure through the end of the mold opposite said receiving end and retaining said receiving end open during such application of air pressure, thereby blowing the unchilled core of glass out of the mold and leaving a tubular blank of glass within the mold.

16. In a machine for forming glass tubes, the combination of a mold open at one end to receive a charge of glass, means for bringing said mold into operative relation to a supply body of molten glass, means for exhausting the air from the mold and thereby introducing a blank of glass by suction into the mold, and means for supplying air under pressure to the mold while said receiving end remains open and thereby expelling a portion of the glass and giving the blank a hollow tubular formation extending to the said open end of the mold while the blank is still integrally united with the supply body.

17. In a machine for forming glass tubes, the combination of a mold having an open end, means for introducing a charge of molten glass into the mold through said end and causing the glass in contact with the mold walls to be chilled to a certain depth, and means for applying pneumatic pressure at the opposite end of the mold and retaining said first mentioned end open during such application of pressure, and thereby expelling the interior unchilled portion of glass from the blank.

18. In a machine for forming glass tubes, the combination of a mold open at one end, means to introduce a charge of molten glass into the mold and cause the glass in contact with the mold walls to be chilled to a certain depth, and means for maintaining said end open and concomitantly supplying air under pressure through the opposite end of the mold and thereby blowing the unchilled core of glass from the blank and out of the mold through said open end.

19. A machine for forming glass tubes comprising a suction gathering mold open at one end to receive a charge of glass, means for bringing said end of the mold into operative relation to a supply body of molten glass, means for drawing a charge of glass by suction into the mold, and means for applying air under pressure to the glass through the opposite end of the mold while 20. A machine for forming glass tubes comprising a suction gathering mold open at one end to receive a charge of glass, means for bringing said end of the mold into operative relation to a supply body of molten glass, means for drawing a charge of glass by suction into the mold, means for applying air under pressure to the glass through the opposite end of the mold while the charge receiving end is still open and thereby expelling the interior core of soft glass through said open end, and means for severing the glass at said open end.

21. A machine for forming glass tubes comprising a suction gathering mold open at one end to receive a charge of glass, means for bringing said end of the mold into operative relation to a supply body of molten glass, means for drawing a charge of glass by suction into the mold, and means for retaining said receiving end of the mold open and applying air under pressure to the glass through the end of the mold opposite said open end while the blank of glass is still integrally united with the supply body.

22. In a machine for forming glass tubes, the combination of a mold carriage, a suction gathering mold open at its lower end to receive a charge of glass, means for rotating the carriage and bringing said end of the mold into operative relation to a supply body of molten glass, means for exhausting air from the mold and causing a blank of glass to enter the mold, and means for applying air under pressure through the upper end of the mold while the lower end is still open, and blowing the core of unchilled glass from the blank back into the supply body.

23. In a machine for forming glass tubes, the combination of a mold carriage, a suction gathering mold open at its lower end to receive a charge of glass, means for rotating the carriage and bringing said end of the mold into operative relation to a supply body of molten glass, means for exhausting air from the mold and causing a blank of glass to enter the mold, means for applying air under pressure through the upper end of the mold while the lower end is still open, blowing the core of unchilled glass from the blank back into the supply body, and a knife operable to sever the tube of glass at the lower end of the mold while the latter is still over the supply body.

24. A machine for forming glass tubing comprising a body mold having a cylindrical cavity extending therethrough, a head mold in register with the body mold at one end thereof, means for introducing a charge of glass through the opposite end of the body mold and forming a head on the blank within said head mold, and means for causing the blank to assume the form of a tube united with said head and extending through the body mold and open at the end opposite said head.

25. A machine for forming glass tubing comprising a body mold having a cylindrical cavity extending therethrough, a head mold in register with the body mold at one end thereof, means for introducing a charge of glass through the opposite end of the body mold and forming a head on the blank within said head mold, means for causing the blank to assume the form of a tube united with said head and extending through the body mold and open at the end opposite said head, and means for opening the body mold and leaving the tube suspended from the head mold.

26. In a machine for forming glass tubes, the combination of a mold having a mold cavity extending therethrough and opening through the end of the mold, means for bringing said open end of the mold into sealing contact with a pool of molten glass, and pneumatic means for causing a portion of glass to enter the mold and assume the form of a tube extending from the receiving end of the mold through substantially the entire length of the mold while the glass is still united with the supply body.

27. The method of producing a glass tube which comprises introducing molten glass into a mold cavity at one end thereof, the shape of which cavity conforms substantially to the exterior shape of the tube to be produced, and causing said glass as it enters said cavity, to fill a length of said cavity extending from said end and less than the entire length thereof, causing the walls of the blank to be chilled and hardened to a predetermined depth by extraction of heat by the mold walls, causing the core of plastic glass to move away from said end of the mold into the remaining portion of the mold cavity, and molding it therein to tubular form.

28. The method of forming a glass tube within a mold which comprises, drawing a blank of molten or plastic glass by suction into an elongated mold cavity through one end of the mold and thereby filling a section of the mold cavity adjoining said end, causing the walls of the mold to extract heat from the blank while retained in said position and chill the walls of the blank to a predetermined depth while said walls of the blank are retained in said section of the mold cavity, forcing the interior comparatively soft glass out of the blank by pressure applied at said end of the mold while said chilled walls are retained in said position, and molding said soft glass to tubular form in the mold cavity.

29. In a machine for forming glass tubes, the combination of a mold open at one end to receive a charge of glass, means for bringing the mold into operative relation to a supply body of molten glass, means for exhausting air from the mold and thereby introducing a blank of glass by suction into the mold, means for severing the glass at the end of the mold before sufficient glass has been drawn to nearly fill the mold, and means for continuing the application of suction within the mold after the glass is thus severed, and thereby causing the comparatively soft central portion or core of glass to be forced into the remaining unfilled portion of the mold.

30. In a machine for forming glass tubes, the combination of a mold open at one end to receive a charge of glass, means for bringing said mold into operative relation to a supply body of molten glass, means for exhausting the air from the mold and thereby introducing a blank of glass by suction into the mold, means cooperating with the mold to give the blank a hollow tubular formation extending to the said open end of the mold while the blank is still integrally united with the supply body, and means brought into activity after the blank has been given said tubular formation to sever it from the supply body.

31. The method of producing glass tubing which comprises projecting a blank of glass outwardly from a supply body of molten glass and giving the blank the exterior shape and size of a length of the tube to be produced, chilling the walls of the blank to a depth corresponding to the thickness of the tube desired, removing the plastic glass from the interior of the blank by a continued movement thereof in the direction in which the blank is projected from the supply body, thereby forming said length of the tube, and forming said plastic glass while still integral with said length of tube into a length of tubing integral with and forming an extension of said first mentioned length.

32. The method of producing glass tubing which comprises projecting a solid blank of glass outwardly from a supply body of molten glass and giving the blank the exterior shape or contour of a length of tube to be produced, chilling the walls of the blank to a depth corresponding to the thickness of the tube desired, subjecting the ends of said blank to a differential pressure greater at the end adjoining the supply body, while the blank is still integral with the supply body, and thereby initiating an outward movement of the plastic glass from the interior of the blank, and continuing the outward movement of said plastic glass and simultaneously molding it into a length of tubing integral with and forming a continuation of said first mentioned length.

33. The method of producing a glass tube which comprises projecting a blank of glass from a supply body of molten glass into a mold cavity, the shape of which cavity conforms substantially to the exterior shape of the tube to be produced, causing said blank to fill a length of said cavity adjacent the said supply body, causing the walls of the blank to be chilled and hardened to a predetermined depth by extraction of heat by the mold walls, subjecting the ends of the blank to a differential pressure while the blank is still integral with the supply body, said pressure being greater at the end of the blank adjacent said supply body and thereby causing a movement of the core of plastic glass away from the supply body, and continuing said movement of said plastic glass into the remaining portion of the mold cavity and molding it therein to tubular form.

Signed at Toledo, Ohio, this 29th day of October 1929.

AUGUST KADOW.